June 27, 1972  S. R. BROWN  3,673,026
METHOD FOR THE MANUFACTURE OF LAMINATED FABRICS
Filed Jan. 12, 1970  2 Sheets-Sheet 1

INVENTOR.
Sterling Robert Brown
BY
ATTORNEYS

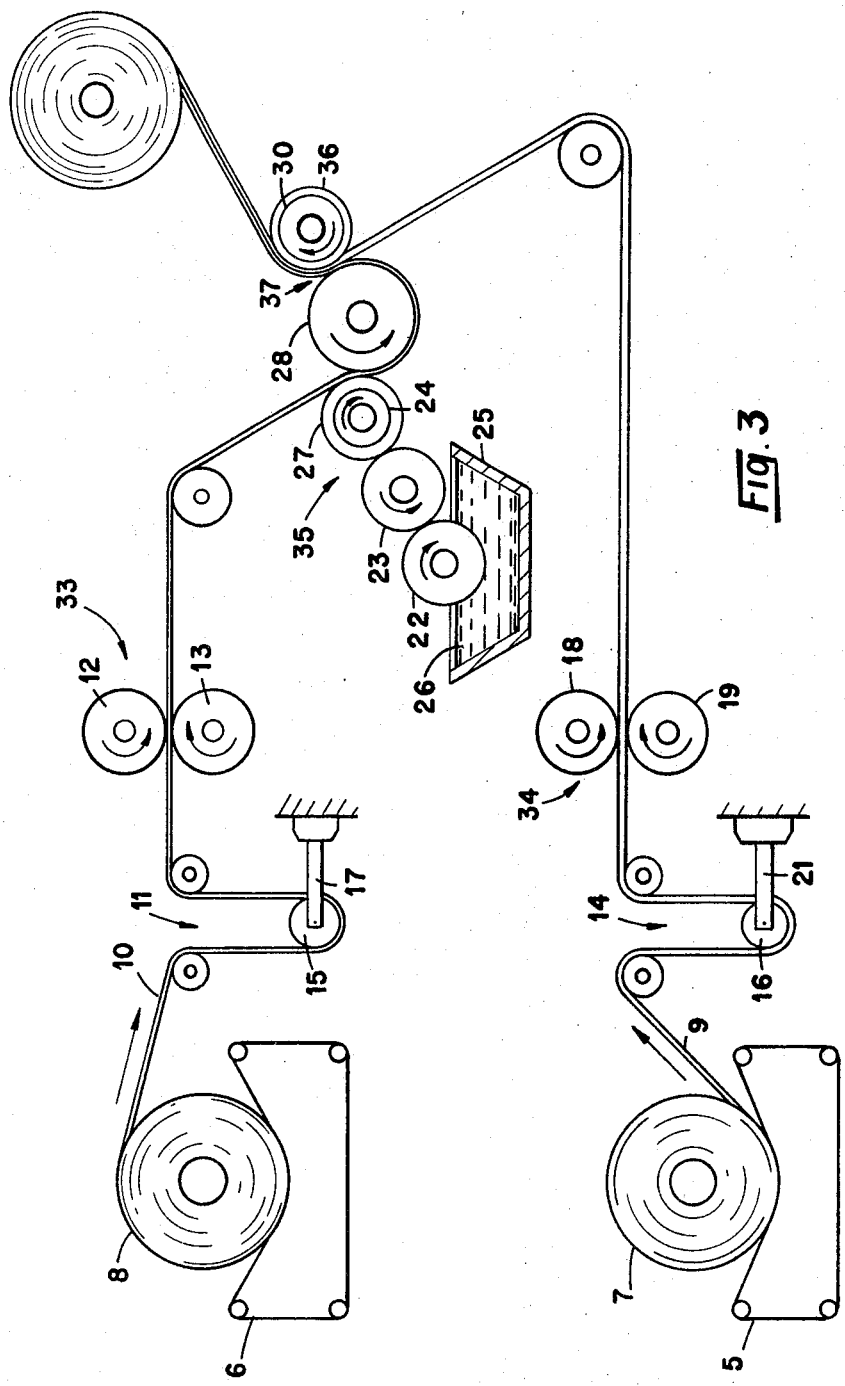

United States Patent Office 3,673,026
Patented June 27, 1972

3,673,026
METHOD FOR THE MANUFACTURE OF LAMINATED FABRICS

Stirling Robert Brown, Oxnard, Calif., assignor to International Paper Company, New York, N.Y.
Filed Jan. 12, 1970, Ser. No. 2,002
Int. Cl. B32b 31/08
U.S. Cl. 156—164
24 Claims

ABSTRACT OF THE DISCLOSURE

A method for the manufacture of laminated fabrics wherein separate webs are differentially stretched and bonded in superposed relation by means of limited bondings separated by substantial unbonded regions. Thereafter the bonded webs are relaxed, whereupon one web contracts more than the other web, and the webs separate in the unbonded regions. The webs also may be individually deformed before being superposed so as to project a portion of the fibers of each web out of the plane of each web in a pattern over substantially the entire surface area of each web and provide relatively permanently set interruptions in the planar structure of said web on at least one surface of the web for purposes of increasing the stretchable quality of the webs. The deformed webs may be superposed with surface interruptions of one web facing inwardly of the superposed webs so as to abut the other web or its surface interruptions and thus maintain the superposed webs out of intimate contact at least in the unbonded regions.

---

This invention relates to laminated nonwoven fabrics and specifically to a method for manufacturing a laminated nonwoven fabric of controlled bulk.

Nonwoven materials have found extensive use in disposable items which were heretofore produced from woven textiles, i.e. cloth. Acceptance of nonwoven materials by the consumer is in part dependent upon the nonwoven materials exhibiting the desirable characteristics heretofore found in woven materials. For example, woven materials, in general, are soft and exhibit substantial strength and bulk. It is desirable therefore to produce a nonwoven material having like properties. It has been proposed heretofore to prepare nonwoven fabrics by laminating two or more nonwoven webs. It has also been proposed that such laminated webs be puckered to impart bulk to the fabric product, such puckering being achieved by incorporating elastic materials into the laminate while such materials are in a stretched state and thereafter relaxing the elastic materials so as to cause puckering of the product. Incorporating elastic materials into nonwoven laminates is frequently undesirable for the reason that these materials usually increase the cost of the product, either because of the additional raw material or because of the complicated fabrication apparatus required. Such added elastic materials also have been found to undesirably alter the physical properties of the product for some end uses. For example, the substantial initial elongation required of the elastic material to achieve puckering in the product can appreciably alter the strength characteristics of the product.

It is therefore an object of the present invention to provide a method for the manufacture of nonwoven materials, particularly laminated nonwoven fabrics of controlled bulk. It is also an object to provide a method for the manufacture of nonwoven materials wherein the bulk of the products may be controllably established through selection of the conditions of manufacture. Other objects and advantages of the invention will appear from the following description and the accompanying drawings. In the drawings:

FIG. 3 is a representation of one embodiment of apparatus for carrying out the method of this invention.

Figure 1:
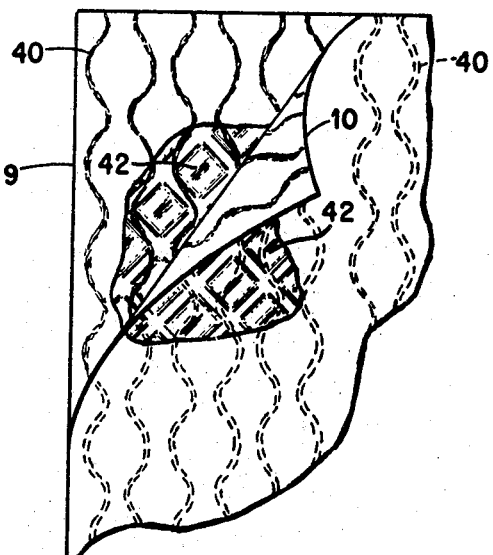
FIG. 1 is a representation of one embodiment of the laminated product of this invention depicting various features of the invention including one suitable embossing pattern for deforming the webs.

In accordance with the present method, separate webs of nonwoven material, e.g. creped tissue or bonded synthetic fiber, are elastically stretched to different degrees of elongation, and laminated by bonding one to another while in their differentially stretched states, the bonded webs being thereafter relaxed so as to produce different degrees of contraction in each web with resultant separation of the webs in the unbonded regions and controlled bulk in the laminate. Bonding the webs one to another while in their stretched states by means of limited bondings separated by substantial unbonded regions and thereafter relaxing the webs has been found to result in a multiplicity of puffed or puckered areas which form over the surface of the product due to different degrees of respective web contractions when the stretched webs are relaxed after bonding. The areas of web puckering which result upon relaxation of the webs impart desirable bulk to the laminated product. Differential stretching, as contemplated in the present invention, includes the situation where only one web is actually stretched and the other web is maintained slack or nearly so. In many instances, however, both webs will be stretched, one to a greater extent than the other.

Because many nonwoven webs or their fibrous matter are relatively inelastic, such nonwoven webs cannot be stretched sufficiently in accordance with the present invention to achieve bulk equivalent to that of woven materials. Moreover, certain nonwoven webs are harsh to the touch and preferably are conditioned to impart thereto acceptable softness, drape or the like.

In accordance with one aspect of this invention, the stretchability of one or both nonwoven webs may be increased and the webs made suitable for use in the present invention by deforming the web so as to project portions of the fibers of the web out of the plane of the web in a pattern over substantially the entire surface area of the web and provide relatively permanently set interruptions in the planar structure of the web on at least one surface of the web. The web deformation, in conformity with this aspect of the invention, imparts to the web stretchable quality such that the web may be thereafter elastically stretched and will contract to approximately its original dimensions when relaxed from its stretched state. It has been found that several forms of web deformation are acceptable, each in any event deforming the separate webs prior to lamination so as to impart stretchability to the web. The deformed structure is formed in a three-dimensional pattern relatively permanently set into the web as by embossing, crimping, or similarly treating the web. By three-dimensional, it is meant that the flat structure of the web is altered to cause portions thereof to be deformed out of the original plane of the web. The set is preferably repeated at regular or irregular, but closely spaced, intervals so as to produce a pattern comprising a very large number of deformations over the entire surface area of the web. These deformations are relatively permanent and provide "extra" web within a given area of web so that when the web is subsequently stretched there is sufficient material available for expansion without destroying the interfiber bonds and producing failure of the web, as by rupture. For example, the web deformation may comprise material available for expansion without destroying the quantity of fibrous material for elongation of the web without rupture when it is stretched during a subsequent manufacturing step.

In accordance with another aspect of this invention, the bulk of the laminated product produced by the present method may be increased by deforming one or both of the non-woven webs as set forth above, except that the surface interruptions may be utilized to maintain the superposed webs out of intimate contact. This result is achieved by providing interruptions in the surface of one or both webs such that when the webs are overlaid with the surface interruptions facing inwardly of the laminate; the interruptions position the webs apart from each other at least in the unbonded regions and increase the bulk of the product. These latter interruptions in the web may impart stretchable quality to the web and increase its stretchability but need not necessarily so function. That is, facing surface interruptions which do not appreciably alter the stretchability of the web can be useful for the purpose of maintaining superposed webs spaced out of intimate contact with one another. By changing the height to which the interruptions project from the web proper, it is possible to select, within limits, the degree of web separation.

Preferably the web deformation of this invention will take the form of embossing, crimping or the like and is preferably performed as a manufacturing step intermediate the steps of unwinding webs from their rolls at the front end of the procedure and laminating the webs at or near the conclusion of the procedure. It is preferred that the web be deformed in a manner which provides surface interruptions over substantially the entire surface of the web. For imparting stretchability, it is also preferred that the interruptions be substantially continuous, that is, each interruption blends into neighboring interruptions without substantial flat web in between. Such continuous interruptions flatten or stretch out more readily than do discrete interruptions which are spaced apart with substantial flat web areas therebetween. Non-continuous interruptions are useful, however, where they are to be used primarily for the purpose of maintaining the superposed webs spaced apart.

It is noted that, in the present invention, the elasticity of the individual fibers of the web plies is not depended upon to impart stretchability to each web. Many kinds of nonwoven webs may be employed therefore. For example, it is contemplated that paper fiber nonwovens may be used. It is also contemplated that synthetic fibers or other materials such as glass will be employed in many of the nonwovens of this invention. Additionally, it is possible in the present invention to produce fabrics of controlled bulk from combinations of paper, glass and/or synthetic fiber webs.

The fibers in paper nonwovens are normally laid down in the form of a matted web. The fibers are relatively short and generally quite randomly oriented. Many paper nonwovens, therefore, are relatively square as respects their physical properties. On the other hand, certain paper nonwovens have their fibers predominantly oriented along their machine direction, i.e. parallel to the forward direction of paper travel during its manufacture, and exhibit greater strength, or other quality, in their machine direction than in their cross direction, i.e. normal to their respective forward direction of travel during manufacture. In any event paper fibers are generally inherently relatively inelastic and are bonded together to form the nonwoven web. Since the fibers are relatively inelastic, the bonds rupture when the paper web is stretched substantially resulting in tearing of the web.

Synthetic fibers are usually relatively long. They are normally laid down in a thin sheet or web with considerable crossings of fibers. The web is made coherent by bonding the fibers at their crossings. These fibers may be more or less inelastic, depending primarily upon the chemical composition of the fibers. In the present invention, the fibrous nonwoven webs are deformed so as to make the web stretchable as distinguished from making the fibers themselves stretchable.

The preferred process in accordance with the present invention is continuous, that is, the webs are continuously unwound, overlaid, bonded and thereafter relaxed. For the preferred control of the laminated product bulk, two webs are continuously fed to the laminating station and bonded together while in different conditions of stretch. When web deformation is included, this step is continuous also, as by passing the webs continuously between respective sets of embossing rolls. The absolute rate of forward travel of each web is of less significance than is the relationship of such rates to the rotation rates of the respective sets of embossing rolls.

With reference to FIG. 3, lamination is achieved in the present invention while passing the two webs through a laminating station 35 at a common rate so that the two webs are pulled from respective deforming stations 33, 34 at the common rate. Then by operating one deforming station, for example a set of embossing rolls, at a slower rate than the other deforming station, and at the same time operating the laminating station at a faster rate than either of the deforming stations, the two webs are stretched to different extents in the span between the deforming stations and the laminating station. For producing certain products, e.g. paper toweling, it has been found acceptable to operate the laminating station 35 between about 1.0% and 2.4% faster than deforming station 33 and between about 3.0% and 4.9% faster than the other deforming station 34. With reference to FIG. 3, these relative rates of forward travel of the web result in web 9 being stretched on the order of 2% more than web 10.

Continuously differentially stretching two webs in the process can be accomplished by applying greater hold-back of one web during unwind. However, to produce the surface interruptions desired in the present invention, web deformation is best achieved when the webs are relatively slack and not strongly tensioned by hold-back in the unwinding step. A further aspect of this invention provides a means for continuously deforming the webs in a suitable manner and also continuously differentially stretching the webs. This is achieved by feeding that web which is to be more stretched to its respective deforming station at a forward rate of travel which is faster than the rate of web travel through such deforming station. This action supplies web to the deforming station sufficiently fast to crowd the web into the deforming station and cause the web exiting the deforming station to possess more web per unit area than when it entered the deforming station. The "extra" web per unit area makes available additional fibrous structure for increasing the stretchability of the web. At the same time, preferably the second and lesser stretched web is fed to its deforming station in a relaxed state as nearly as feasible, taking into consideration the fact that the rolled web is usually wound under tension, hence in at least a slightly stretched state as it is unwound.

When employing creped tissue webs, appropriate crowding of the respective webs into their respective sets of embossing rolls is achieved by unwinding web 9 and feeding it forwardly at a rate about 4.5% faster than the rate it travels through its embossing rolls while maintaining a tension of about 1.03 p.l.i. (pounds per lineal inch) on the web. Simultaneously, web 10 is unwound and fed forwardly to its set of embossing rolls at a rate of forward travel about 1.8% faster than the rate it travels through its embossing rolls while maintained under about 2.18 p.l.i. tension. These relative rates have been found to provide the crowding of the webs at their respective embossing stations as will provide for the desired different degrees of web elongation discussed above.

Employing this crowding concept, it is then possible to regulate the respective rates of forward progression of the webs through these respective deforming stations so as to hold back more on the web which is to be more stretched and thereby establish the desired differential web stretching. For example, it has been found that by unwinding one web at a rate which is about 1.8% faster than the rate of travel of such web through its deforming station, and unwinding the other web and feeding it forwardly at a rate of travel about 4.5% faster than it is passed through its respective deforming station, while simultaneously moving the latter web through its respective deforming station about 2% slower than the former web is moved through its deforming stations with the latter web being crowded substantially more than the former web. As has been found in the present invention, by this means, at each deforming station there is provided a sufficient accumulation of web material to serve the two-fold objective of thorough deformation and subsequently controlled elastic stretching of the webs to different degrees of elongation as they are simultaneously and continuously fed to a laminating station under different conditions of stretch.

The two webs may be suitably joined and retained in superposed relation by an adhesive disposed between the webs. For example, it is satisfactory to apply adhesive to one side of one web (web 10, for example) and simultaneously pass the overlaid web 9 with the web 10 through a nip 37 between laminating pressure rolls 28, 30 so that adhesive is transferred to the second web to effect bonding of the webs into a laminate. Additionally, the pressure applied in the nip presses the adhesive into the webs and enhances the adhesive bond and assists in completely bonding the webs one to another while in their respective stretched states so as to preclude slippage of one web with respect to the other after passing through the laminating station.

Figure 2:
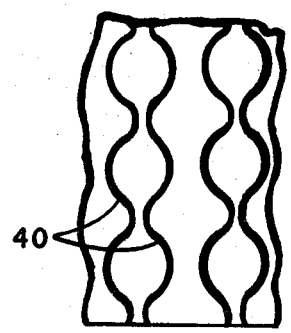
FIG. 2 is a representation of one suitable pattern of adhesive for bonding together the web plies in accordance with the present invention.

The desired product bulk is best achieved when the adhesive employed to bond the stretched webs one to the other is disposed between the webs in patterned lines delineating substantial unbonded areas. One suitable pattern of adhesive is shown in FIG. 2 and comprises a plurality of lines of adhesive 40. Whereas continuous lines are depicted, lines comprising a series of aligned spots of adhesive are equally efficacious. Further the lines may define diamond, circular or near circular patterns. Preferably these lines of adhesive are about 0.0625 inch in width, spaced such as to define unbonded regions encompassing about 1 square inch each. Depending upon the bulkiness desired in the product and its intended end use, these unbonded areas may be as large as 3 square inches in area. This adhesive may be applied by "printing" the adhesive onto one side of a web by means of a plate roll 24 having a surface mat 27 which is provided with a pattern of the type shown in FIG. 2. As web 10, FIG. 1, is passed between the plate roll 24 and an impression roll 28, the adhesive is "printed" onto the web in accordance with the selected pattern of lines. The adhesive-bearing web 10 is preferably trained around the impression roll and passed, simultaneously with web 9, through the further nip 37 formed between the impression roll 28 and the second plate roll 30 which carries a second mat 36, the rolls 24, 28 acting as laminating pressure rolls. In nip 37, the two webs are pressed together only as the pattern lines on mat 36 bear against the web in the nip. By running plate rolls 24 and 30 in registry, only those web areas having adhesive disposed therebetween receive pressure in nip 37, thereby assuring a successful bond between the webs with only minimal destruction of the deformation of each web.

An acceptable adhesive for bonding paper webs may be formulated by admixing 5 parts of polyvinyl alcohol sold under the trade name Covol 9870 (distributed commercially by Corn Products Co., New York, N.Y.) with 80 parts of water, 1 part of a wetting agent such as that sold under the trademark Triton X-100 (distributed by Rohm and Haas Co., Philadelphia, Pa.) and 0.1 part of an antifoaming agent such as that sold under the trade name Antifoam B (distributed by Rohm and Haas Co.).

Typically, the products produced through use of the presented method exhibit bulk and hand equivalent to that of woven fabric such as cotton cloth. As desired, the bulk of the product can be altered to that most suitable for the intended end use of the product. The product strength is in part determined by the selected raw material as modified by the improved strength obtained by the patterned adhesive employed to bond the webs into a laminate and the improved ability of the bulky product to absorb shear and shock forces without rupture.

FIG. 1 depicts one embodiment of the laminated product of this invention comprising two superposed webs 9, 10 bonded one to the other by an adhesive disposed between the webs in a pattern of lines 40. One corner of web 10 is turned back to show the adhesive lines 40 between the webs and also to show a multitude of embossments 42 on each web. These embossments represent one embodiment of the web deformation accomplished in accordance with this invention and are noted to preferably extend over the entire area of each web. For purposes of clarity in illustrating other features of the product, only a portion of the embossments of each web is shown.

For purposes of clarity, the present discussion will hereinafter deal only with deformation by embossing. It is not intended that the invention be so limited however. Referring specifically to FIG. 3, depicting one embodiment of apparatus for carrying out the method of this invention, separate rolls 7, 8 of web material are supported on respective endless belts 5, 6 which are driven by appropriate means (not shown) so as to continuously pay out webs 9 and 10, respectively. These webs are fed forwardly through separate sets of rolls 11 and 14, each set of rolls including a tension roll 15, 16 adjustably mounted as by arms 17, 21 so as to maintain the separate webs taut. The arms 17, 21 may be adjustably positioned by jack screws, air cylinder mounts or the like which are not shown in FIG. 3. From their respective sets of rolls 11, 14, webs 9 and 10 are fed forwardly to respective deforming stations 33 and 34. For discussion purposes as stated above, each deforming station may include a hard steel embossing roll 12, 19 having its cylindrical surface engraved to create a pattern of surface protuberances on each roll. One suitable embossing pattern is depicted in FIG. 1 and comprises a multiplicity of dimpled diamond-shaped embossments extending to a height of about 0.030 inch and spaced apart by about 0.377 inch center to center. Steel mating rolls 13 and 18 are provided for embossing rolls 12 and 19, such mating rolls having their surfaces engraved to provide mating depressions or cavities into which the surface protuberances of the embossing rolls mesh, whereby web material passed through the nip of each set of embossing rolls has imparted thereto an embossed pattern in accordance with the engraved surfaces of the embossing rolls.

From the embossing stations, the embossed webs 10 and 9 are passed forwardly to a laminating station indicated generally at 35 and comprising a fountain roll 22 partly immersed beneath the surface of a liquid adhesive 26 contained in a tank 25. A transfer roll 23 is interposed between said fountain roll 22 and the plate roll 24 having the rubber impression mat 27 disposed on its cylindrical surface, such that upon simultaneous rotation of the fountain roll, transfer roll, and plate roll, adhesive is picked up from tray 25, transferred in metered quantity to roll 23, and thence further transferred to impression mat 27 on the surface of roll 24. Web 10 is passed through the nip formed by the plate roll 24 and a smooth-surfaced impression roll 28, whereby adhesive is transferred from mat 27 onto one side of web 10. As depicted in FIG. 1, web 10 is trained around the impression roll 28 and fed simultaneously with web 9 through the further nip 37 between the impression roll 28 and the second plate roll 30 having its surface covered by the second rubber impression mat 36 corresponding to the mat 27 of the plate roll 24. The adhesive partially sets up prior to the nip 37. In the preferred embodiment, roll 30 and roll 24 are rotated in registry such that pressure is exerted in nip 37 only upon those areas of the webs 9 and 10 having adhesive disposed between them. This presses the partially set up adhesive into the respective webs and bonds them together without pressing out the embossing in the adhesive free regions.

The rates of rotation of the impression roll 28 and plate rolls 24, 30 of the laminating station 37 are sufficiently faster than those of the embossing rolls 12 and 19 as to stretch webs 10 and 9 during their passage from the embossing rolls to the laminating station.

EXAMPLE I

Following the procedures set forth above, two separate webs of creped tissue paper, each 0.0025 inch thick and having a crepe ratio of 1.32, a basis weight of 5 lbs. (per ream of 2880 square feet) and a negligible wet strength were fed through separate sets of embossing rolls, each with a pattern of conical embossments. Each web was embossed over its entire surface area. Each raised portion on each embossing roll was of conical geometry, extended to a height of 0.030 inch from the surface of the rolls, and possessed side walls included at a 30 degree angle with respect to the principal axis of the projection. The embossed protuberances on each web were spaced from each other about 0.0625 inch center to center. The two sets of embossing rolls were oppositely disposed such that the embossed protuberances of the two webs faced each other as they exited the embossing rolls. That is, embossing rolls 12 and 19, having protuberances thereon, were urged against the sides of the respective webs 10 and 9 that were on the outside of the laminate. This side of each web was the dryer side (the "dryer" side being that side of the creped web which contacted the dryer from which the web was doctored during a final step of its manufacture).

One of the embossed webs was directed through the nip between impression roll 28 and the pattern roll 24 having its surface covered by the rubber impression mat 27 patterned with the pattern depicted in FIG. 2. The raised pattern of this mat extended to a height of 0.045 inch from the mat surfaces. Each pattern line was uniformly 0.0625 inch wide. In this example, 0.002 ounce of adhesive was transferred to each square foot of the first web 10 as it was passed between the pattern roll 24 and the impression roll 28. Polyvinyl alcohol adhesive in the formula described above was used. The viscosity of the adhesive as applied to the fountain roll 22 was 520 centipoises.

Following application of the adhesive to the first web 10, the second web 9 was overlaid on the web 10 with the respective protuberances of each web facing the other web and with the patterned adhesive between the webs. The webs 9 and 10 with the adhesive therebetween were passed through the nip 37 between the impression roll 28 and the matching pattern roll 30, where sufficient pressure was applied to force the partially set-up adhesive into bonding relation in the two webs 9 and 10, hence joining the webs into a two-ply laminate.

In this example, the web 10 was unwound and fed to embossing rolls 12, 13 at 1000 feet per miunte (f.p.m.), while the web 9 was fed to embossing rolls 18, 19 at 1008 f.p.m. Embossing rolls 18, 19 were rotated at a speed such that web 9 was passed therethrough at 963 f.p.m. (4.5% slower than the web feed rate). Embossing rolls 12, 13 were rotated faster to pass web 10 therethrough at the rate of 982 f.p.m. (1.8% slower than the web feed rate). Rolls 18, 19 were thus operated about 2% slower than rolls 12, 13. Web 10 was maintained taut under a tension of about 2.18 p.l.i. by the tension roll 15. Web 9, under a tension of about 1.03 p.l.i., was maintained taut by the tension roll 16.

The embossed webs were bonded into a laminate as they passed through nip 37 at 999 f.p.m. This rate, being 3.7% faster than the web travel at embossing rolls 18, 19 and 1.7% faster than the web travel at embossing rolls 12, 13, resulted in web 9 being stretched about 2% more than web 10.

After lamination the relaxed webs contracted different amounts and produced a laminated product which had a quilted and cushioned quality. When cut to width, perforated and collected on rolls, 325 sheets each 6 inches long on a core 1½ inches in diameter formed a roll 5 inches in diameter. Two creped tissue webs of the same basis weight, crepe ratio, etc. were laminated using the same procedure as set forth in this example except the webs were not differentially stretched. The latter product, when cut to width, perforated and collected in rolls containing 325 sheets each 6 inches long on a core 1½ inches in diameter formed a roll 4¾ inches in diameter.

The product so produced was tested for strength using a Hounsfield tensometer, 62½ lbs. beam, in accordance with TAPPI Standard T404ts–66, except the jaw was set at 3" and the sample was 2" wide (values given in lbs. 1" wide). Its strength was found to be 1.1 lbs. measured parallel to its machine direction and 0.84 lb. in its cross direction.

Critical length is a measure of the flexibility and softness of the product. Critical length of the product was determined in accordance with ASTM No. D 1388–64, using a cantilever bending tester and found to be 7.97 cm. in the machine direction and 6.1 cm. in the cross direction.

The rate of absorbency of the product, as tested in accordance with TAPPI Standard T432ts–64 (1/10 ml.), was found to be 1.3 seconds. Its rate of absorbency was 1.0 second when tested using Canadian Government specification Board 9–Gt–4a, Sec. 6.3.1 (except sample was 6" x 6").

The lines of adhesive bonding the webs together defined separated unbonded regions, thus the laminate had many separated areas of weakness that permitted bending, twisting, flexing, etc. of the product. The tissue product therefore exhibited drape characteristics substantially like those of cloth and other woven fabrics. In use the product conformed readily to the hand of the user and to the contour of the wiped surface. Its smooth surfaces and softness made the product ideally suited for the usual delicate uses of facial or bathroom tissue.

EXAMPLE II

In one example employing the present method to produce a nonwoven fabric useful as household toweling, two creped tissue webs 9, 10, each 0.0034 inch thick, having a basis weight of 13 lbs. per ream of 2880 square feet, and a crepe ratio of 1.3, were fed continuously forward to and through respective embossing stations and thence to a laminating station as set forth hereinbefore. Web 10 was unwound and fed to embossing rolls 12, 13 at 1000 feet per minute (f.p.m.), while web 9 was fed to embossing rolls 18, 19 at 1008 f.p.m. Embossing rolls 18, 19 were rotated at a speed such that web 9 was passed therethrough at 963 f.p.m. (4.5% slower than the web feed rate). Embossing rolls 12, 13 were rotated faster to pass web 10 therethrough at the rate of 982 f.p.m. (1.8% slower than the web feed rate), or stated alternatively, the webs were both crowed at the embossing rolls. Rolls 18, 19 were operated 2% slower than rolls 12, 13. Web 10 was maintained taut under a tension of about 2.18 p.l.i. by roll 15. Web 9, under a tension of about 1.03 p.l.i., was maintained taut by roll 16. The surfaces of the embossing rolls were engraved according to the pattern shown in FIG. 1.

The embossed webs were bonded into a laminate as they passed through nip 37 at 999 f.p.m. This rate, being 3.7% faster than the travel of web 9 at embossing rolls 18, 19 and 1.7% faster than the travel of web 10 at embossing rolls 12, 13 resulted in web 9 being stretched about 2% more than web 10.

In the laminating station, web 10 was directed through the nip between the impression roll 28 and the pattern roll 24, the latter having a mat 27 patterned as depicted in FIG. 2. The pattern lines were 0.0625 inch wide and defined separated areas about 1 square inch in area which did not receive adhesive. In this example, about 0.002 ounce of polyvinyl alcohol in the formula described above was transferred to each square foot of web 10. The viscosity of the adhesive as applied to the fountain roll 22 was 517 centipoises.

After the adhesive was applied to the first web 10, the second web 9 was overlaid on the web 10 with the respective raised portions of one web abutting those of the other web and with the patterned adhesive between the webs. The webs 9 and 10 with the adhesive therebetween were passed through the nip 37 between the impression roll 28 and the matching pattern roll 30, where sufficient pressure was applied to force the partially set-up adhesive into bonding relation, hence joining the webs into a two-ply laminate.

After lamination the relaxed webs contracted to different degrees and produced a product having a thickness of about 0.009 inch in the unbonded areas, indicating an increase in bulk of about 0.0022 inch due to the treatment afforded the webs in accordance with the present method.

The product had a basis weight of 25 lbs. per ream of 2880 sq. ft. It was cut to width and divided into sheets by perforations and collected on rolls. One hundred thirty sheets each 10 inches long on a core 1½ inches in diameter formed a roll 5¾ inches in diameter.

The toweling so produced was tested for strength using a Hounsfield tensometer, 62½ lb. beam, and following TAPPI Standard No. T404ts–66 (10 plies). Its tensile strength was found to be 2.15#/in. wide in M.D.; 1.15#/in. wide in C.D. Using a cantilever bending tester and ASTM No. D 1388–64 (except 1" x 7" sample), the present product exhibited critical lengths of 7.14 cm. in the machine direction and 6.01 cm. in the cross direction which indicates significantly greater flexibility than the flexibility of typical prior art toweling materials. Further the product possessed a hand very similar to woven fabric. It ready conformed to a wiped surface and exhibited excellent wiping quality.

The absorbency rate of the product was found to be 2.4 seconds when measured in accordance with TAPPI Standard T432ts–64 and 3.5 seconds when measured in accordance with Canadian Government Specification Board 9–Gt–4a, Sec. 6.3.1 (except using 6" x 6" area).

Various modifications may be made within the scope of the invention. For example, the webs 9 and 10 may be passed through the adhesive laminating apparatus 35 in other paths. The web 10 may be passed through the nip between the transfer roll 23 and the pattern roll 24, and the web 9 may be overlaid at the nip between the pattern roll 24 and the impression roll 28. Other patterns of embossing and adhesive may be used. Various features believed to be novel are included in the following claims.

What is claimed is:

1. A method for the manufacture of laminated non-woven fabric and comprising the steps of
    stretching each of a pair of elongated fibrous webs in a direction substantially parallel to their respective web lengths by different amounts within their respective elastic limits,
    overlaying said stretched webs,
    bonding said overlaid webs one to another by means of limited bonding areas separated by substantial unbonded regions while holding said webs in their stretched states, and thereafter
    relaxing said bonded webs whereupon said webs contract different amounts to effect puffing in said unbonded regions.

2. The method of claim 1 wherein said fibrous webs comprise paper.

3. The method of claim 2 wherein said fibrous webs comprise creped tissue.

4. The method of claim 3 wherein said creped tissue webs each have a crepe ratio between about 1.2 to 1.5, a basis weight between about 5 to 16 pounds per ream of 2880 square feet, and the direction of stretch of each web is perpendicular to the creping of said web.

5. The method of claim 1 wherein the web bonding step comprises disposing an adhesive between said overlaid webs in a pattern of limited bonding areas separated by substantial unbonded regions.

6. The method of claim 5 wherein said adhesive is a thermoplastic material and the web bonding step includes the further step of subjecting said overlaid webs with thermoplastic adhesive disposed therebetween to heat and pressure whereby said adhesive is softened and while said adhesive is softened said overlaid webs are pressed into contact to effect bonding between said webs.

7. The method of claim 5 wherein said overlaid webs with adhesive disposed therebetween are pressed together in the adhesive-bearing regions and substantially no pressure is applied to the adhesive free regions so as to enhance the adhesive bonding between said overlaid webs within the limited bonding areas without compressing said overlaid webs in the unbonded regions.

8. The method of claim 1 wherein at least one of said webs comprises a thermoplastic web.

9. The method of claim 8 wherein the web bonding step comprises heating said thermoplastic web to soften said web and while such web is soft pressing said overlaid webs into bonding contact in limited regions spaced apart so as to create limited bonding areas separated by substantial unbonded regions.

10. The method of claim 1 wherein said webs are bonded in superposed relation while one of said webs is stretched between about 1.6% and 2.4% more than the other of said webs.

11. A method for the manufacture of laminated non-woven fabric and comprising the steps of
    deforming at least one of a pair of elongated flat deformable fibrous webs so as to project a portion of the fibers of such web out of the plane of said web in a pattern over substantially the entire surface of said web and provide relatively permanently set interruptions in the planar structure of said web,
    stretching said fibrous webs in a direction substantially parallel to their respective web lengths by different amounts within their respective elastic limits,
    overlaying said stretched webs,
    bonding said overlaid webs one to another by means of limited bonding areas separated by substantial unbonded regions while holding said webs in their stretched states, and thereafter
    relaxing said bonded webs whereupon said webs contract different amounts to effect puffing in said unbonded regions.

12. The method of claim 11 wherein said stretched webs are overlaid with the surface interruptions on the deformed web facing the overlaid web and spacing the two webs apart at least in the unbonded regions.

13. The method of claim 11 wherein the web deforming step comprises embossing the web.

14. The method of claim 11 wherein the web deforming step comprises crimping the web.

15. A method for the manufacture of laminated non-woven fabric and comprising the steps of
    separately deforming each of a pair of flat elongated fibrous webs so as to project a portion of the fibers of each web out of the plane of the web in a pattern over substantially the entire surface of the web and provide relatively permanently set interruptions in the planar structure of the web on at least one surface of the web, stretching each of said webs in a direction substantially parallel to its respective lengths by different amounts within its respective elastic limits, overlaying said stretched webs with surface interruptions of one web facing surface interruptions of the other web so as to position said overlaid webs out of intimate contact, bonding said overlaid webs one to another by means of limited bonding areas separated by substantial unbonded regions while holding said webs in their stretched states and thereafter relaxing said bonded webs whereupon said webs contract different amounts to effect puffing in said unbonded regions.

16. The method of claim 15 wherein the web deforming step comprises separately embossing each of said webs with a pattern of embossments such that the embossments of one web will not nest in the embossments of the other web when the webs are overlaid.

17. The method of claim 11 wherein the surface interruptions provided in said deforming step impart stretchability to such web.

18. A method for the manufacture of laminated nonwoven fabric and comprising steps of heating a flat elongated fibrous web comprising thermoplastic fibers to at least the softening point of said thermoplastic fibers so as to render it deformable, deforming said web so as to project a portion of the fibers of such web out of the plane of the web over substantially the entire surface of the web and provide relatively permanently set interruptions in the planar structure of the web, elastically stretching said deformed web in a direction substantially parallel to its length by an amount within its elastic limit, overlying said stretched web on a further flat elongated fibrous web stretched in a direction substantially parallel to its length to a lesser extent than said first web, bonding said overlaid webs one to another by means of limited bonding areas separated by substantial unbonded regions while holding said webs in their stretched states, and thereafter relaxing said bonded webs whereupon said webs contract different amounts to effect puffing in said unbonded regions.

19. A method for the manufacture of laminated nonwoven fabric and comprising the steps of continuously stretching each of a pair of elongated fibrous webs in a direction substantially parallel to their respective lengths by different amounts within their respective elastic limits, continuously overlaying said stretched webs, continuously bonding said overlaid webs one to another by means of limited bonding areas separated by substantial unbonded regions while holding said webs in their stretched states, and thereafter, relaxing said bonded webs whereupon said webs contracting different amounts to effect puffing in said unbonded regions.

20. A method for the manufacture of laminated nonwoven fabric and comprising the steps of continuously deforming at least one of a pair of flat elongated deformable fibrous webs so as to project a portion of the fibers of such web out of the plane of said web in a pattern over substantially the entire surface of said web and provide relatively permanently set interruptions in the planar structure of said web, continuously stretching each of said fibrous webs in a direction substantially parallel to its respective length by different amounts within their respective elastic limits, continuously overlaying said stretched webs, continuously bonding said overlaid webs one to another by means of limited bonding areas separated by substantial unbonded regions while holding said webs in their stretched states, and thereafter, relaxing said bonded webs whereupon said webs contract different amounts to effect puffing in said unbonded regions.

21. A method for the manufacture of laminated nonwoven fabric and comprising the steps of continuously feeding each of a pair of elongated flat fibrous webs forwardly to respective deforming stations at different speeds of web travel, continuously deforming each web so as to project a portion of the fibers of each web out of the plane of the web in a pattern over substantially the entire surface of the web and provide relatively permanently set interruptions in the planar structure of the web, continuously stretching each of said fibrous webs in a direction substantially parallel to the direction of web movement, continuously overlaying said stretched webs, continuously bonding said overlaid webs one to another by means of limited bonding areas separated by substantial unbonded regions while holding said webs in their differentially stretched state, and thereafter relaxing said bonded webs whereupon said webs contract different amounts to effect puffing in said unbonded regions.

22. The method of claim 21 wherein each of said webs is fed forwardly to its respective deforming station at a rate of forward travel faster than its respective rate of forward travel through its respective deforming station, the rate of forward travel of one web being greater than the rate of forward travel of the other web, and the respective rates of forward travel of said webs as they pass through their respective deforming stations are selected so that the web having the faster rate of forward travel is passed through its respective deforming station at a slower rate of forward travel than the rate of forward travel of the other web through its respective deforming station, and said webs are continuously laminated while traveling at a common rate of forward travel.

23. The method of claim 21 wherein one of said webs is fed to its respective deforming station at a rate of forward travel between about 1.4% and 2.2% faster than the rate of forward travel of such web through its respective deforming station and the other of the webs is fed to its respective embossing station at a rate of forward travel between about 4.0% and 4.9% faster than its rate of forward travel of such web through its respective deforming station and the respective rates of forward travel of said webs as they pass through their respective deforming stations are selected so that the web having the faster rate of forward travel is passed through its respective deforming station at a slower rate of forward travel than the rate of forward travel of the other web through its respective deforming station, and said webs are continuously laminated while traveling at a common rate of forward travel.

24. In a process for manufacturing a multi-ply absorptive paper product, the steps comprising: continuously embossing a pair of webs of cellulosic material to form a plurality of closely spaced embossments, continuously printing an adhesive on selected minor portions of one of said webs by passing said one web through a nip including a patterned roll having corresponding selected minor portions raised thereon and a back-up roll to thereby apply adhesive to said web in the area of said nip where said raised portions bear against said back-up roll, the remainder of said web being substantially free of adhesive, said minor raised portions being arranged in an open pattern leaving large areas relative to the size of the embossments free of adhesive, continuously traveling said other web towards said one web for engagement with the adhesive printed thereon and selectively uniting said webs in the areas carrying adhesive.

References Cited

UNITED STATES PATENTS

| | | | |
|---|---|---|---|
| 2,705,692 | 4/1955 | Petterson | 156—163 |
| 2,697,678 | 12/1954 | Ness et al. | 156—229 |
| 3,547,723 | 12/1970 | Gresham | 156—229 |
| 2,235,682 | 3/1941 | Hawley, Jr. | 156—164 |
| 2,978,006 | 4/1961 | Clemens | 156—210 |

CARL D. QUARFORTH, Primary Examiner

B. H. HUNT, Assistant Examiner

U.S. Cl. X.R.

156—181, 210, 220, 229

UNITED STATES PATENT OFFICE
CERTIFICATE OF CORRECTION

Patent No. 3,673,026  Dated June 27, 1972

Inventor(s) Stirling Robert Brown

It is certified that error appears in the above-identified patent and that said Letters Patent are hereby corrected as shown below:

Column 2, line 69, delete "exapansion" and substitute --expansion-- therefor;

Column 2, line 72, omit "material available for expansion without destroying the" and insert --embossing the web under conditions which increase the-- therefor;

Column 7, line 28, delete "included" and substitute --inclined-- therefor;

Column 9, line 46, delete "ready" and insert --readily-- therefor;

Column 10, line 8, delete "to" and substitute --and-- therefor;

Column 11, line 26, following "comprising" and before "steps" insert --the--;

Column 11, line 60-61, delete "contracting" and substitute --contract-- therefor.

Signed and sealed this 30th day of January 1973.

(SEAL)
Attest:

EDWARD M. FLETCHER, JR.
Attesting Officer

ROBERT GOTTSCHALK
Commissioner of Patents